United States Patent [19]
Curtis et al.

[11] Patent Number: 6,092,154
[45] Date of Patent: Jul. 18, 2000

[54] METHOD OF PRE-CACHING OR PRE-FETCHING DATA UTILIZING THREAD LISTS AND MULTIMEDIA EDITING SYSTEMS USING SUCH PRE-CACHING

[75] Inventors: Allen J. Curtis, Simi Valley; Stephen T. Whiteley, Newhall; Reza A. Rassool, Valencia, all of Calif.

[73] Assignee: Intel Corporation, Santa Clara, Calif.

[21] Appl. No.: 08/966,771

[22] Filed: Nov. 7, 1997

Related U.S. Application Data

[63] Continuation of application No. 08/305,572, Sep. 14, 1994, abandoned.

[51] Int. Cl.[7] .................................................. G06F 13/00
[52] U.S. Cl. ........................................... 711/137; 711/113
[58] Field of Search .................................. 711/3, 4, 111, 711/112, 113, 118, 137; 395/309, 383, 872, 876, 115; 345/507, 508, 512, 185, 201; 710/129, 52, 56; 712/207, 237

[56] References Cited

U.S. PATENT DOCUMENTS

| | | | |
|---|---|---|---|
| 4,593,354 | 6/1986 | Ushiro | 714/48 |
| 4,604,691 | 8/1986 | Akagi | 712/207 |
| 4,719,570 | 1/1988 | Kawbe | 712/207 |
| 4,746,994 | 5/1988 | Ettlinger | 360/13 |
| 4,860,199 | 8/1989 | Langendorf et al. | 711/213 |
| 4,888,679 | 12/1989 | Fossum et al. | 712/6 |
| 4,894,772 | 1/1990 | Langendorf | 712/240 |
| 4,980,823 | 12/1990 | Liu | 711/136 |
| 5,008,820 | 4/1991 | Christopher, Jr. et al. | 707/1 |
| 5,136,696 | 8/1992 | Beckwith et al. | 712/240 |
| 5,283,873 | 2/1994 | Steely, Jr. et al. | 712/207 |
| 5,285,527 | 2/1994 | Crick et al. | 711/118 |
| 5,287,487 | 2/1994 | Priem et al. | 711/204 |
| 5,305,389 | 4/1994 | Palmer | 382/305 |
| 5,317,713 | 5/1994 | Glassburn | 711/113 |
| 5,371,861 | 12/1994 | Keener et al. | 710/129 |
| 5,410,653 | 4/1995 | Macon, Jr. et al. | 711/137 |
| 5,421,014 | 5/1995 | Bucher | 709/100 |
| 5,442,747 | 8/1995 | Chan et al. | 345/509 |

FOREIGN PATENT DOCUMENTS 0463874  1/1992  European Pat. Off. .

*Primary Examiner*—Glenn Gossage
*Attorney, Agent, or Firm*—Oppenheimer Wolff & Donnelly

[57] ABSTRACT

A method of pre-caching data using thread lists, and a multi-media editing system using such a pre-caching method, are disclosed. A list of data which will be required by a host application is passed to a data storage device such as a hard disk drive, CDROM drive, or other data storage device. The data storage device locates the data and stores it in its own storage device buffer. Thus, the data is immediately available when requested by the host. The pre-caching method may be used in a multimedia or video editing system to quickly retrieve data from storage devices. The thread list may include a video thread, an audio thread and a data access parameter reflecting host data application requirements. The data access parameter may include at least one of data prioritization, cache management, error processing including resend capability, and data supply rate. The thread list may also include data specifying a percentage of the storage device buffer to be reserved for read ahead data and a percentage of the storage device buffer to be reserved for data which has been previously provided to the host computer.

21 Claims, 4 Drawing Sheets

METHOD OF PRE-CACHING OR PRE-FETCHING DATA UTILIZING THREAD LISTS AND MULTIMEDIA EDITING SYSTEMS USING SUCH PRE-CACHING

This application is a continuation of application Ser. No. 08/305,572, filed Sep. 14, 1994, now abandoned.

INTRODUCTION

The present invention relates generally to an improved method of retrieving data from storage devices such as hard disk drives, RAID systems, CD ROM drives, digital tape systems, optical storage devices, holographic storage devices and semiconductor memory systems. More particularly, the present invention relates to a pre-caching system for use with video editing applications and other applications which require timely retrieval of large amounts of data which may be stored in a variety of locations within the storage device.

BACKGROUND OF THE INVENTION

Hard disk drives are well known and commonly used storage devices. Accordingly, although the present invention is not limited for use with hard disk drives, they will be used to illustrate the background of the invention and problems associated with the prior art.

A host computer is typically connected to a hard disk drive by a small computer system interface (SCSI) bus. Hard disk drives generally include one or more hard disks, a read/write head and a controller. In the most basic systems, the host computer sends a series of SCSI read commands to the hard disk drive's controller in response to the requirements of an application program. After each command, the requisite data is located on the disk, retrieved and sent to the host over the SCSI bus. Significant overhead, or data delivery latencies, are built into this basic system. In other words, the data stream to the host computer may be interrupted due to "housekeeping" activities and data seeking.

On the host side, these latencies include the time period between the reading of the last data byte and the sending of last data byte over the SCSI bus, the time period between the sending of the last data byte and "bus free," the time period required for the host to execute the next SCSI data request and the time period required for the host to arbitrate for the bus and send the last command byte. When data required by the host application is not contiguously located on the disk, disk side overhead includes the time required to move the head to a new track and the time required for the requisite portion of the disk to rotate to the head.

Caching data in fast memory is one way of improving the performance of computer systems. Caching involves transferring data from a storage device to a faster random access cache memory. If data required by the application program is not in the cache memory, then the storage device is accessed, thereby causing the application to wait. Such situations are referred to as cache misses.

Predictive caching is a method of reducing the number of instances where data required by the application program must be retrieved from the storage device instead of the cache memory. Predictive caching programs are sometimes stored in the firmware associated with the storage device's controller. One common predictive caching method is known as the "read ahead" caching scheme. The "read ahead" caching scheme simply involves reading data from the next sector on the current cylinder after information is read from the current sector. Obviously, the "read ahead" scheme is most effective where large amounts of data are contiguously stored within the storage device. There are, however, a number applications where blocks of data from many different locations within the storage device must be sequentially accessed. Here, the aforementioned data delivery latencies are experienced each time there is a cache miss because the next data block is not located in the next storage area within the storage device.

One application that is not well suited for "read ahead" predictive caching schemes is video editing. Video editing systems often require three data streams, two audio and one video. The audio data streams require 96 Kbytes/sec, while the video data stream requires 3.6 Mbytes/sec. In video editing systems, such as the Lightworks System by Lightworks Editing Systems Ltd., located in London, England, an edit decision list (EDL) is produced which describes the order that the audio and video clips will be mixed. The EDL is essentially an access schedule listing various blocks of data within the storage device. Unfortunately, this data is rarely contiguously stored within the storage device. In order to accommodate the data stream requirements, prior art video editing systems have employed host-based data caching schemes in which large amounts of audio and video data can be stored. Such host-based cache management techniques require a buffer having at least 32 Mbytes of costly random access memory. Such memory can add thousands of dollars to the retail cost of the system. In addition, the host CPU must be used to manage the host based cache memory.

Accordingly, a need exists for a caching scheme which is capable of supplying an uninterrupted stream of non-contiguously stored data to the host, but which does not require large amounts of expensive random access memory.

OBJECT AND SUMMARY OF THE INVENTION

The general object of the present invention is to provide a caching system which obviates, for practical purposes, the aforementioned problems is the art. In particular, one object of the present invention is to provide an improved method of retrieving random physical data from a storage device in a predetermined logical manner that is capable of accommodating video editing applications and other applications that require timely retrieval of large amounts of data that is not contiguously stored within the storage device.

In order to accomplish these and other objectives, the present invention provides a storage device-based pre-caching system. In accordance with the present pre-caching system, a list is passed to the storage device which includes the addresses of a number of data blocks required by the host application. This list is referred to as a thread list. The storage device locates the data and stores it in a buffer. Simultaneously, as read commands are received from the host, data which has been located and stored in the buffer is sent to the host. In other words, the storage device continues to locate data on the list and store it in the buffer while the host sends commands to retrieve the data that it needs from the buffer.

The present invention provides a number of advantages over the prior art. In particular, the present invention provides a caching system in which the storage device has pre-knowledge of the data which must be cached. When the storage device has such pre-knowledge, it can use its own cache memory (often 2–4 Mbytes in a hard disk drive, for example) to store the data that is about to be requested by the host. As such, the need for expensive host-based caching capabilities is eliminated. Additionally, cache memory management may be performed by the storage device controller, not the host CPU, thereby improving the efficiency of the host application. Moreover, the storage device controller can take advantage of its knowledge of the physical characteristics of the storage media, which the host does not have, to optimize data retrieval.

BRIEF DESCRIPTION OF THE DRAWINGS

Detailed descriptions of preferred embodiments of the invention will be made with reference to the accompanying drawings.

DETAILED DESCRIPTION OF THE PREFERRED EMBODIMENT

The following is a detailed description of a preferred embodiment of the present invention. This description is not to be taken in a limiting sense, but is made merely for the purpose of illustrating the general principles of the invention. The scope of the invention is defined by the appended claims.

Additionally, although the preferred embodiment of the present invention is described in the context of an audio/video (or multi-media) editing system, it is not limited to such applications. Rather, the present invention is susceptible to use in a variety of applications including, but not limited to, operating systems, file management systems, database systems and other systems which have pre-knowledge of the data that they will need.

Hints and Threads

Two fundamental concepts associated with the present invention are "threads" and "hints." As such, each concept will be defined in detail prior to the discussion of the preferred audio/video editing embodiment.

Threads

A thread is an independent data agent that is created by a host application, when needed, to maintain a predetermined logical data stream from the storage device.

As used herein, an agent is a cooperative task created to perform a specific function. Thus, a thread is an independent process within the storage device firmware created to maintain a data stream either to or from the storage device. In multimedia applications, a number of threads (audio, video and graphic) may be required to accommodate the requisite data streams. Where applications can determine future data requirements, threads may be created to manage that data stream. Such threads may contain information which is useful in managing storage device access and memory resources.

The phrase "logical data stream" is representative of an application specific data stream. In other words, threads are capable of accessing data in an application specific manner. In multi-media applications, for example, the data is accessed in terms of video frames and corresponding audio chunks. In database applications, data may be accessed in terms of database entries.

Threads are composed of a thread ID and one or more block entries. In video applications, a block entry would be a clip, i.e. a series of video frames. Each block entry may include a starting logical block address (LBA), an offset to the first byte and the number of bytes. Accordingly, the thread specifically defines the data of interest, not merely the LBA which contains the data of interest. Also, block entries may be arranged in the order that the associated data will be needed by the host application. This enables the storage device to effectively pre-fetch data.

Figure 1:
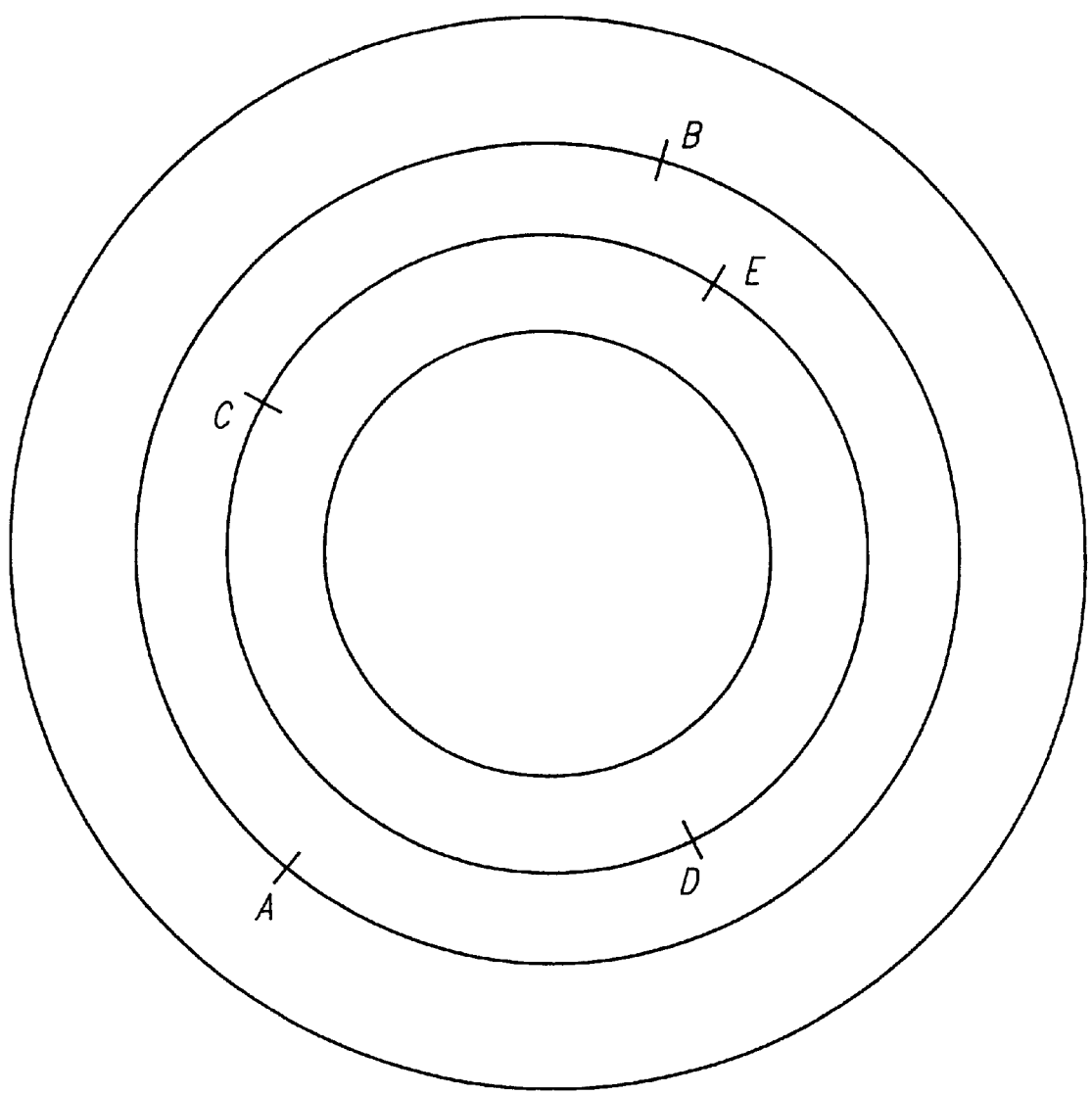
FIG. 1 shows a storage disk employed in a data reading process in accordance with the present invention.

The thread list also allows the storage device to more effectively shift between different storage areas during a reading operation. In other words, the storage device can use the pre-knowledge of the data required by the host and the knowledge of its own physical characteristics to optimize data retrieval operations. As illustrated for example in FIG. 1, which shows a hard disk, a thread list indicating that the data located in storage areas AB and CD, which are located on different tracks, is needed by the application may be passed to the disk drive. The disk controller may then use this information to determine the most efficient manner in which to read the data. For example, after storage area AB has been read, area CD may be read in two segments ED and CE. As such, the drive controller does not have to wait until the disk rotates to point C after changing tracks before beginning the reading process. Obviously, similar data retrieval optimization techniques may be employed in other types of storage devices.

A sample definition list may be used to further define a thread. As used herein, a sample is a data element in its native form. For example, in video applications a sample is a single video frame. In database applications, a sample is a single database entry. Samples may be either fixed or variable in size. The sample definition list specifies whether each sample is of fixed or variable length and its size. Samples may be accessed by sample number in the following manner. For a given sample number, the sum (in bytes) of the preceding samples is determined. This sum is equivalent to the number of bytes that the sample is offset from the beginning of the LBA. Thus, a sample may be located by merely advancing the determined number of bytes from the starting LBA.

Hints

Hints are used to customize thread operations in order to achieve the functionality required by the host application. In other words, hints are data access parameters that describe how the data should be retrieved. They reflect the instantaneous data requirements of the host application. They control prioritization, cache management, error processing and thread type. Hints are especially important in multi-media applications where audio and video data must be supplied at different rates. Various data access parameters, which are required to support multi-media applications and other applications such as databases and file systems, are described below.

The first group of data access parameters consists of the following process control parameters: thread type, thread priority and data not ready. With respect to thread type, different applications have different data access requirements. These data access requirements are represented by the thread type parameter. In multi-media applications much of the data is stored on the storage media in blocks of sequential data. In database applications, data may be specified, but the order in which it will be retrieved by the host often cannot be determined. Finally, in file systems, it is advantageous to specify certain areas of the disk, such as the file allocation table, which should be cached.

The thread priority parameter prioritizes the data in the data stream. This allows low priority data to be sacrificed if the data throughput required by the host cannot be maintained by the storage device. This parameter is normally user defined and varies from application to application. In multimedia applications, for example, audio data is given higher priority than video data because the viewer is more likely to hear the results of an audio data stream discontinuity. Video data stream discontinuities are relatively easy to hide. For example, the previous video frame can be shown again.

The data not ready parameter informs the storage device what it should do if the data required by the host is not stored in its cache or cannot be retrieved from the storage medium within the required time. One option is to send an error message. Another is to simply resend the last sample requested by the host.

The second group of data access parameters includes the following cache management parameters: cache size, cache proximity control, thread cache control and thread write control. With respect to cache size, this parameter tells the storage device how much cache memory should be reserved. This parameter is especially useful in applications where data is not stored in the storage device in a sequential manner and control is required over the cache allocation.

There will be situations where the cache will not be able to store all of the data specified within a thread. The cache proximity control parameter is used to make sure that the data which is most likely to be requested by the host application is available in the cache. In a sequential thread, the data maintained in the cache should be directly related to the current position of the pointer within the thread. Such proximity caching is not particularly useful in all applications. For instance, in database applications, threads lists normally reflect the probability of data retrieval. In those instances where data requested by the host is not stored in the cache, it is located on the storage media by the storage device's controller. This should not, however, effect the data that is stored in the cache.

Thread cache control is used in conjunction with proximity caching to specify what respective percentages of the cache should be dedicated to forward caching and backward caching. This parameter is especially useful in multi-media applications where quick responses to changes in play direction are required.

Finally, the thread write control parameter is employed when write caching is used while information is being written onto the storage media. A number of options are available for each thread. For example, all of the information designated by the thread may be immediately written to the storage media. Another option is to immediately write all of the data into the cache and then return control to the host application. The data may then be written onto the storage media during idle periods. Finally, all of the data written to the storage media may be kept in cache for future reference.

The third group of data access parameters are the data retrieval parameters. This group includes the sequential data rate parameter and the reverse data parameter. The sequential data rate parameter specifies the rate at which data from a particular thread will be requested from the storage device. In multimedia applications, for example, data rate would be defined in terms of a audio and video sample rates. It is used to optimize data retrieval scheduling from the storage device to meet the demands of all current threads. The data rate information allows the storage device to calculate when the next data request for each thread will occur. This information, along with sample size, allows the storage device to determine the latest time that each data retrieval operation must begin in order to be ready for a corresponding data request. The storage device then schedules retrieval operations based on the predetermined data retrieval times.

The data reverse parameter is especially useful in multimedia applications. This parameter allows data to be delivered to the host in the same direction as current thread processing. Thus, if the video portion of a multi-media presentation is being played in reverse, then the audio data can also be delivered from the storage device in reverse.

Thread And Hint Operation

There are two basic types of threads, simple (or fixed block) threads and generic threads. Simple threads do not require sample definition lists. They merely take advantage of the basic threads and hints concept to improve the performance of the associated application program. A simple thread includes a list of LBA's and hints which specify the operational characteristics of the thread. Thread access is performed via standard block based SCSI commands. With a simple thread, the storage capacity of the cache is larger than the amount of data to be stored. Simple threads are useful for optimizing the performance of file systems and other block oriented applications. Such threads define a number of fixed blocks which are most likely to be accessed.

Generic threads include specific information regarding each data element of interest to the host application. A generic thread list may be defined which specifies a number of LBA's in a predetermined order. The amount of data defined by the thread may be larger than the storage capacity of the cache. As such, data within the cache changes in response to the thread pointer location. The blocks may then be sequentially read or written. Thus, generic threads can retrieve data in an application specific manner, thereby eliminating the need for the host application to extract individual data elements from data blocks. However, such application specific data retrieval requires custom SCSI commands because standard SCSI commands are block based. Such custom commands must be incorporated into host applications which take advantage of the present invention.

Generic threads may be either sequential or predictive. Sequential threads are useful in applications where a path through the data defined by the thread is set in advance. Predictive threads are used to specify a random accessed list of samples, sorted in the order of probability of access. Predictive threads allow access to any sample in a list where the data is defined in its native form (for example, a video frame or an audio chunk). Predictive threads also allow the cache size to be specified at creation time. Finally, predictive threads allow the drive to reorder the thread based on recent host data requests.

In general, threads may be either dynamic or persistent. Dynamic threads must be created by the host application. Persistent threads, on the other hand, are saved on the storage media and restored in cache after each power cycle or reset. Persistent threads define system or application specific data parameters that are constantly accessed, such as file allocation tables.

Figure 2:
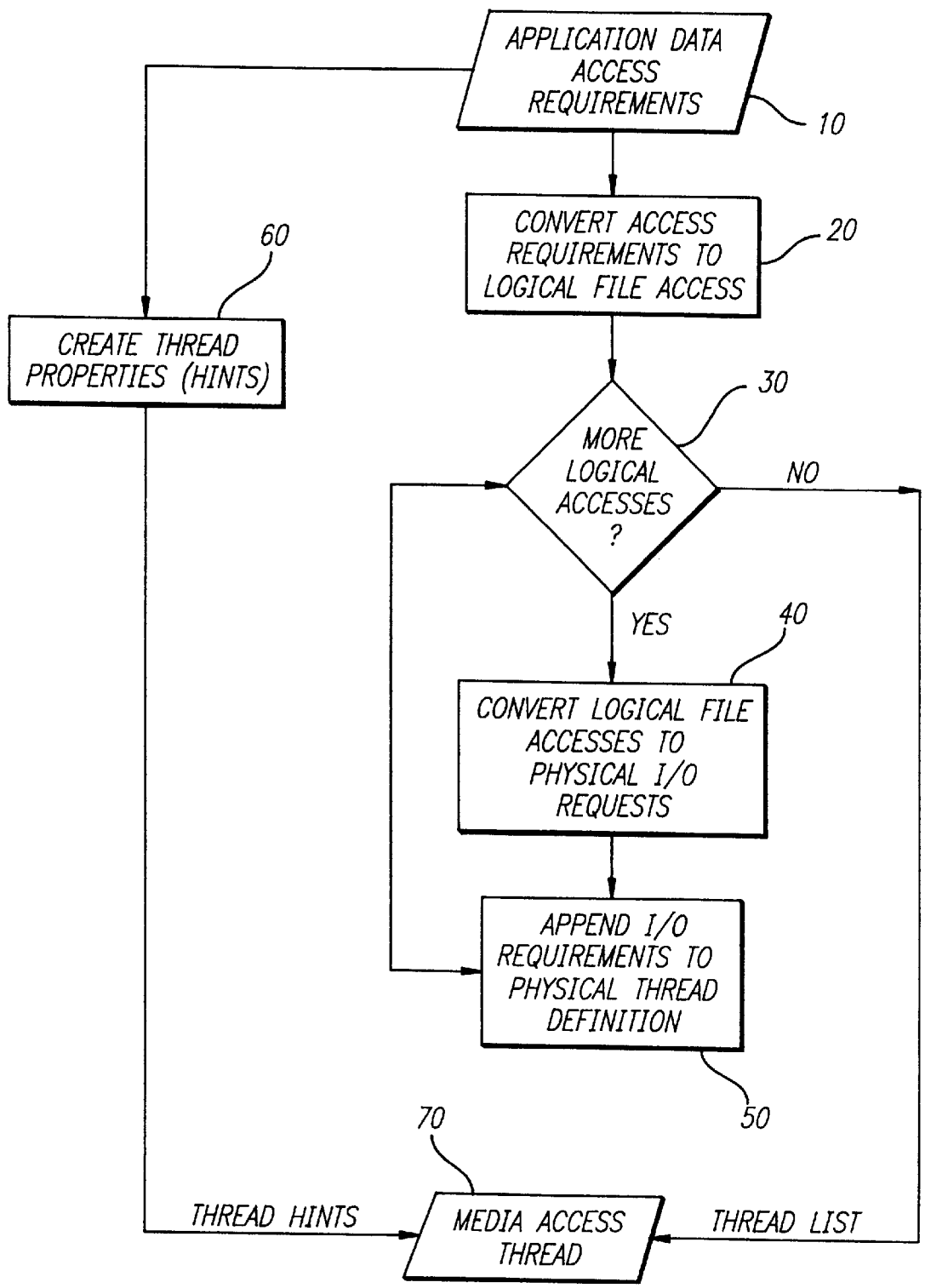
FIG. 2 is a flow chart illustrating one embodiment of the thread and hint creation process.
Figure 3:
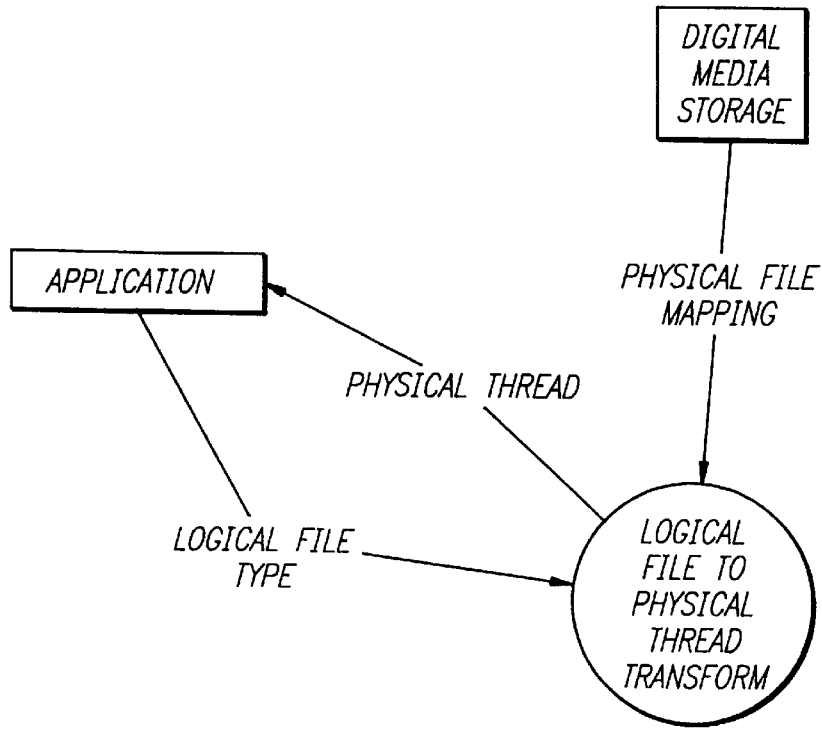
FIG. 3 is a context or state diagram in accordance with the flow chart illustrated in FIG. 2.
Figure 4:
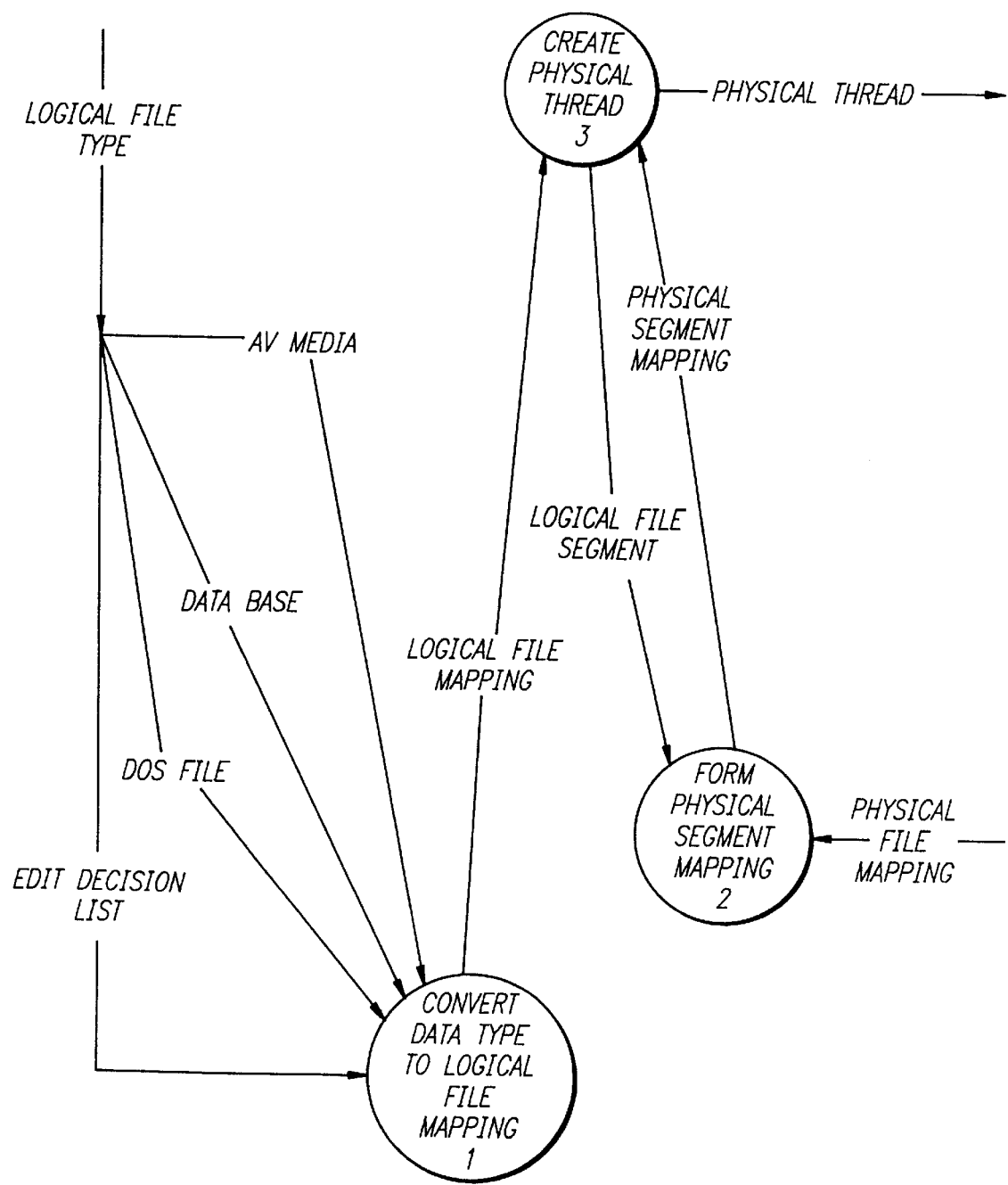
FIG. 4 is a data flow diagram in accordance with the context diagram illustrated in FIG. 3.

FIGS. 2–4 illustrate one example of the thread and hint creation process performed by application programs. Turning to the overview flow chart shown in FIG. 2, step 10 represents the data access requirements of the application program defined in terms of a logical location. In step 20, the data requirement is converted into a block of logical file access data defined in terms of an LBA, an offset to the first byte and the number of bytes. When the data is not contiguously located on the storage media, a list of blocks will be produced. In steps 30–50, the logical file access data is converted into the physical location(s) on the storage media, such as a hard disk, of the data required by the application program. In other words, a thread is formed. Step 30 is a decision block. In step 40, the logical file access data is converted (in a manner described in detail below) into physical I/O requests on a block-by-block basis. The I/O requests are sequentially appended to one another in step 50 to form a physical thread definition list. The hints, i.e. application specific thread parameters such as data rate, are created and supplied by the application program in step 60. The hints are then combined with the thread list in step 70 to form the storage media access thread that is sent to the storage device by the application program.

The context diagram shown in FIG. 3 is an overview of one example of the conversion of logical file data to a physical thread. Such conversion is normally performed by a subroutine within the application program. Generally speaking, a code subroutine (represented by the circle) receives logical file information from the application program and physical file mapping information from the storage medium. A physical thread is then formed based on the received information. The code subroutine represented by the circle in FIG. 3 is shown in greater detail in FIG. 4. First, logical file data is converted into a logical file map on a block-by-block, or segment-by-segment, basis. The logical file data may be one of a number of types, such as an edit decision list, disk operating system (DOS) file; data base and audio-visual (AV) media. Using physical mapping data from the storage media, such as a file allocation table, a physical mapping segment is formed for each logical file segment. The physical thread is then created.

Multi-Media Example

Figure 5:
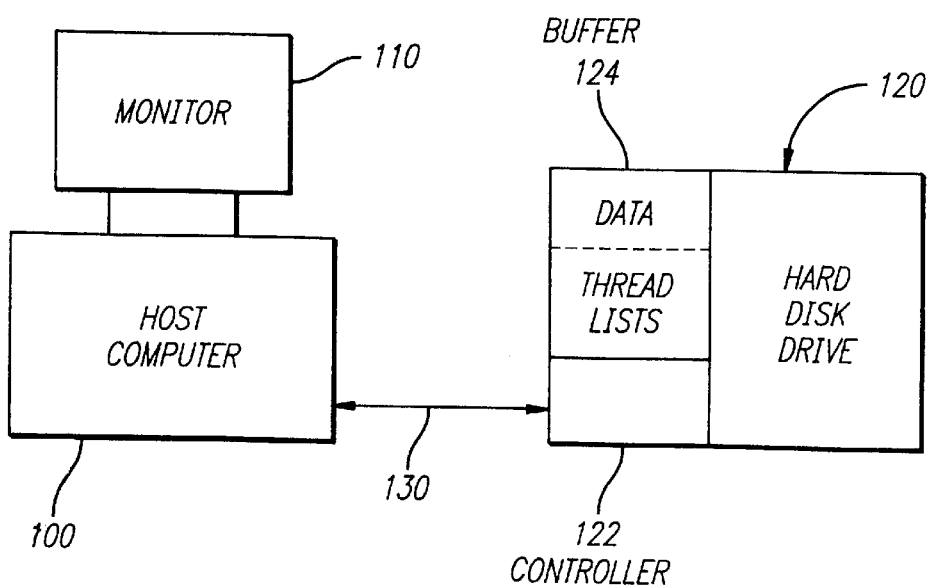
FIG. 5 shows an audio/video editing system including a host computer, a monitor and a hard disk drive.

FIG. 5 is illustrative of a multimedia editing system in which the present invention may be applied. The exemplary multimedia editing system includes a host computer 100, a monitor 110 and a hard disk drive 120 connected to the host computer 100 by an SCSI bus 130. The hard disk drive 120 includes a controller 122 and a buffer 124.

One or more physical threads provided by a host application are supplied to the drive controller 122. In audio/video applications, for example, one video and two audio threads would normally be supplied by the host application. The drive controller 122 then begins to locate this data on the storage disk and store it in the buffer 124. As SCSI read commands are received from the host application, data which has been stored in the buffer is provided to the host computer. The drive controller 122 continues to locate data in accordance with the physical thread while the SCSI commands are received. Accordingly, much of the search time associated with the prior art is eliminated. In those instances where a SCSI read command is received and the associated data is not stored in the buffer 124, the data is simply located by the controller 122 on the storage disk in the usual manner.

TABLES 1–6 are illustrative of SCSI commands which may be used in conjunction with a multimedia implementation of the present invention in a SCSI bus environment. TABLE 1 illustrates the AV mode select page command which is saved on the storage disk and which sets the initial parameters for the drive as it boots up. This command defines a persistent thread on the storage media that describes the file allocation table and the size of a segment of the buffer that can be used for SCSI requests that are not thread related. The rest of the buffer will be available for thread allocation. Because it is stored in non-volatile memory, the drive will always be configured in this manner after a power cycle or a SCSI reset. The persistent thread may have many different types of caching assigned to it. For example, a write through caching scheme involves updating the data in the cache to the storage media right away. Although it is relatively safe, significant overhead may be incurred with such a caching scheme. On the other hand, in a write behind or write back caching scheme, data is stored in the cache until such time as it is convenient to write the data to the storage media. Such a method reduces overhead, but is risky. If for example, a power cycle or SCSI reset occurs before the data is written to the storage media, it will be lost.

TABLE 1

AV Mode Select Page Command

| Byte | | Bit | | | | | | | |
|------|-----|-----|-----|-----|-----|-----|-----|-----|-----|
| Dec | Hex | 07 | 06 | 05 | 04 | 03 | 02 | 01 | 00 |
| 00 | 00 | Reserved | | | Page Code = 0??h | | | | |
| 01 | 01 | | | | Page Length = FFh | | | | |
| 02 | 02 | B | I | T | | M | A | P | |
| 03 | 03 | MSB | Minimum Multi-purpose Read Write Buffer Size | | | | | | |
| 04 | 04 | LSB | Minimum Multi-purpose Read Write Buffer Size | | | | | | |
| 05 | 05 | Thread Definition List Length in Bytes | | | | | | | |
| 06 | 06 | First Entry | | | | | | | |
| ... | ... | ... | | | | | | | |
| 255 | FF | Last Entry | | | | | | | |

Turning to the specifics of the AV mode select page command. The page code byte [byte 00] includes bits [bits 00–05] that identify the AV mode cache parameters. The page length byte [byte 01] specifies what portion of the available memory (255 bytes in the exemplary embodiment) will be used by the persistent thread definition list. The bit map byte [byte 02] specifies caching schemes and includes other bits that may be defined by the user for other purposes. For example, bit 00 may be used to specify whether the caching scheme is write behind (back) or write through. Bytes 03 and 04 specify the space needed to maintain the defined thread, i.e. the thread buffer. If the thread definition is larger than the thread buffer, an error will be returned. Finally, bytes 05 up to 255 specify the persistent thread definition itself.

TABLE 2 illustrates the initialize thread command for a persistent cache thread. Unlike the AV mode select page, it will not exist at power up or after a SCSI reset.

TABLE 2

Initialize Thread Command

| Byte | | Bit | | | | | | | |
|------|-----|-----|-----|-----|-----|-----|-----|-----|-----|
| Dec | Hex | 07 | 06 | 05 | 04 | 03 | 02 | 01 | 00 |
| 00 | 00 | 0 | 1 | 0 | 0 | 1 | 0 | 0 | 0 |
| 01 | 01 | | LUN | | | Thread Tag Number | | | |
| 02 | 02 | B | I | T | | M | A | P | |
| 03 | 03 | MSB | Thread Buffer Size | | | | | | |
| 04 | 04 | LSB | Thread Buffer Size | | | | | | |
| 05 | 05 | MSB | Minimum Prefetch | | | | | | |
| 06 | 06 | LSB | Minimum Prefetch | | | | | | |
| 07 | 07 | Ahead/Behind Buffer Ratio | | | | | | | |
| 08 | 08 | MSB | Thread Definition List Length in Bytes | | | | | | |
| 09 | 09 | LSB | Thread Definition List Length in Bytes | | | | | | |

The initialize thread command performs a number of functions. Byte 01 stores a thread tag number which is assigned by the host. Tag numbers allow a single thread initiator to access multiple threads. A bit map is provided by byte 02 which specifies caching schemes and behavior. The thread buffer size bytes [bytes 03 and 04) specify the amount of memory space needed to maintain the thread. The minimum prefetch bytes [bytes 05 and 06] specify the minimum number of bytes to be prefetched. Byte 07 specifies the relative percentages of the thread buffer that should be reserved for read ahead data and data previously provided to the host computer. Finally, the size, in bytes, of the thread definition list is specified in bytes 08 and 09.

As illustrated in TABLES 3–6, there are many different ways to describe the data within a thread. This information is passed with the initial thread command. Fir example, as shown in TABLE 3, thread data may be described in terms of one or more chunks of data defined by a starting LBA, the length of the thread range in blocks, and the offset of each range from its respective starting LBA.

TABLE 3

| Byte | | Bit | | | | | | | | |
|------|-----|-----|----|----|----|----|----|----|----|----|
| Dec | Hex | 07 | 06 | 05 | 04 | 03 | 02 | 01 | 00 | |
| 00 | 00 | Reserved | | | Data Type = 01h | | | | | |
| 01 | 01 | | | | Number of Thread Ranges | | | | | |
| 02 | 02 | MSB | | | Starting Logical Block Address | | | | | |
| 03 | 03 | | | | Starting Logical Block Address | | | | | |
| 04 | 04 | | | | Starting Logical Block Address | | | | | |
| 05 | 05 | LSB | | | Starting Logical Block Address | | | | | |
| 06 | 06 | MSB | | | Thread Length in Blocks | | | | | |
| 07 | 07 | LSB | | | Thread Length in Blocks | | | | | |
| 08 | 08 | MSB | | | Byte Offset into Start LBA | | | | | |
| 09 | 09 | LSB | | | Byte Offset into Start LBA | | | | | |
| ... | ... | | | | ... | | | | | |

TABLE 4 shows an example of a type of data description, useful in database and audio applications, in which all of the samples are the same size. Only one block of data is defined.

TABLE 4

| Byte | | Bit | | | | | | | |
|------|-----|-----|----|----|----|----|----|----|----|
| Dec | Hex | 07 | 06 | 05 | 04 | 03 | 02 | 01 | 00 |
| 00 | 00 | Reserved | | | Data Type = 02h | | | | |
| 01 | 01 | MSB | | | Sample Size in Bytes | | | | |
| 02 | 02 | | | | Sample Size in Bytes | | | | |
| 03 | 03 | | | | Sample Size in Bytes | | | | |
| 04 | 04 | MSB | | | Sample Size in Bytes | | | | |

TABLES 5 and 6 show sample definitions which are useful in video applications, where the samples are not all the same size. The definition shown in TABLE 5 defines sample sizes in terms of the number of bytes per sample. In TABLE 6, samples are defined in terms of the offset from the last sample.

TABLE 5

| Byte | | Bit | | | | | | | |
|------|-----|-----|----|----|----|----|----|----|----|
| Dec | Hex | 07 | 06 | 05 | 04 | 03 | 02 | 01 | 00 |
| 00 | 00 | Reserved | | | Data Type = 03h | | | | |
| 06 | 06 | MSB | | | Number of Samples | | | | |
| 07 | 07 | LSB | | | Number of Samples | | | | |
| 02 | 02 | MSB | | | Sample Size | | | | |
| 03 | 03 | | | | Sample Size | | | | |
| 04 | 04 | | | | Sample Size | | | | |

TABLE 5-continued

| Byte | | Bit | | | | | | | |
|------|-----|-----|----|----|----|----|----|----|----|
| Dec | Hex | 07 | 06 | 05 | 04 | 03 | 02 | 01 | 00 |
| 05 | 05 | LSB | | | Sample Size | | | | |
| ... | ... | | | | ... | | | | |

TABLE 6

| Byte | | Bit | | | | | | | |
|------|-----|-----|----|----|----|----|----|----|----|
| Dec | Hex | 07 | 06 | 05 | 04 | 03 | 02 | 01 | 00 |
| 00 | 00 | Reserved | | | Data Type = 04h | | | | |
| 06 | 06 | MSB | | | Number of Samples | | | | |
| 07 | 07 | LSB | | | Number of Samples | | | | |
| 02 | 02 | MSB | | | Sample Offset | | | | |
| 03 | 03 | | | | Sample Offset | | | | |
| 04 | 04 | | | | Sample Offset | | | | |
| 05 | 05 | LSB | | | Sample Offset | | | | |
| ... | ... | | | | ... | | | | |

The following thread definition example defines a thread that starts at LBA 0, goes until LBA 512, has a first sample offset 100 bytes from the starting LBA and has samples that are 256 bytes long:

0x01, 0x00000000, 0x0064, 0x0200, 0x02, 0x00000100

Finally, TABLE 7 illustrates one example of a thread access command. A thread tag number and a host ID are required to access a thread. Accordingly, the thread tag number [byte 01, bits 00–04) is provided. The host ID is supplied by the SCSI and is defined by the host. The read/write bit [byte 02, bit 07] specifies whether the thread access is for reading from, or writing to, the storage media. In the preferred embodiment, a 0 specifies read and a 1 specifies write. If the next/previous bit (byte 02, bit 06] is set to 0, then the next sample or N-bytes will be sent and the thread pointer will be incremented by the transfer length in bytes. If the next/previous bit is set to 1, then the thread pointer will be decremented by the transfer length in bytes and the corresponding sample or N-bytes will be sent. The thread pointer will stay at the point of the first decrement. If the pause thread access bit [byte 02, bit 05] is set to 1, then the thread pointer will stay at the point it was when the thread access command was issued. This is useful if, for example, one wanted to "pause" a video presentation, but continue to show the picture. If it is set to 0, then no action will be taken. The sample bit (byte 02, bit 02] indicates whether the thread data will be specified in a thread byte offset (0) or in a thread sample offset (1). If the dump bit [byte 02, bit 01] is set to 1, then the current thread pointer location and thread definition data will we sent to the host. If it is set to 0, then no action will be taken. The thread will be deallocated when the terminate bit [byte 02, bit 00] is set to 1. The memory allocated to maintain the thread will be freed and any data associated with the thread will be flushed. If the terminate bit is set to 0, then no action will be taken. Thread access will be based on the current thread pointer location if the thread start location bytes [bytes 03–06] are 0. If they are non-zero, then the thread pointer will be modified to the thread start location value. The thread pointer location will be given in a sample offset if the sample bit is set to 1, otherwise it will be given as a byte offset based on the absolute byte position within the thread. Finally, the thread access length bytes [bytes 08–0B] specify the transfer size in samples if the sample bit is set to 1, otherwise it will be specified in bytes. If the thread access bytes are set to 0, no data transfer will take place.

TABLE 7

Thread Access Command

| Byte | | Bit | | | | | | | |
|------|-----|----|----|----|----|----|----|----|----|
| Dec | Hex | 07 | 06 | 05 | 04 | 03 | 02 | 01 | 00 |
| 00 | 00 | 0 | 1 | 0 | 0 | 1 | 0 | 0 | 0 |
| 01 | 01 | | LUN | | | Thread Tag Number | | | |
| 02 | 02 | R/W | N/P | Pause | | | Sample | Dump | Term |
| 03 | 03 | MSB | | | | Thread Start Location | | | |
| 04 | 04 | | | | | Thread Start Location | | | |
| 05 | 05 | | | | | Thread Start Location | | | |
| 06 | 06 | LSB | | | | Thread Start Location | | | |
| 07 | 07 | | | | | Reserved | | | |
| 08 | 08 | MSB | | | | Thread Access Length | | | |
| 09 | 09 | | | | | Thread Access Length | | | |
| 10 | 0A | | | | | Thread Access Length | | | |
| 11 | 0B | LSB | | | | Thread Access Length | | | |

In order to modify a thread list, new thread data may be sent with the tag number of the thread to be modified. Similarly, hints may be modified by sending new hints with the corresponding thread tag number. The access thread command may also be used to pass new hints such as cache forward and cache backward.

Finally, it is noted that most storage device manufacturers, such as hard disk drive manufacturers, employ their own proprietary firmware for controlling the operations of the device. Such firmware may have to be slightly modified in order for the device to be used with the present invention. In view of the foregoing SCSI command description, such modifications are well within the purview of those of ordinary skill in the art and, as most manufacturers employ their own proprietary firmware, these modifications will not be explained in detail.

Although the present invention has been described in terms of the preferred embodiment above, numerous modifications and/or additions to the above-described preferred embodiments would be readily apparent to one skilled in the art. It is intended that the scope of the present invention extends to all such modifications and/or additions and that the scope of the present invention is limited solely by the claims set forth below.

We claim:

1. A multimedia editing system, comprising:
    a hard disk drive unit including both (1) at least one hard disk and (2) a drive buffer;
    a host computer;
    an application on the host computer that;
        determines what data will be required for the application and generates a list of predetermined data,
        converts the list into at least one block of file access data,
        determines physical file mapping information relating to the file access data on the hard disk drive unit,
        generates a thread list, including a video thread and at least one audio thread, that includes a list of addresses of data blocks required by the application,
        transfers the thread list to the drive buffer, and
        generates read commands to retrieve portions of the predetermined data when required by the application; and
    a hard disk drive controller, including;
        means for locating predetermined data on the at least one hard disk in accordance with the list of addresses of data blocks of the thread list stored in the drive buffer and storing the predetermined data in the drive buffer, and
        means for sending the predetermined data stored in the drive buffer to the host computer in response to the read commands.

2. A multimedia editing system, comprising:
    a hard disk drive unit including at least one hard disk and a drive buffer;
    a host computer;
    an application on the host computer that;
        determines what data will be required for the application and generates a list of predetermined data,
        converts the list into at least one block of file access data,
        receives physical file mapping information relating to the file access data from the hard disk drive,
        generates at least one thread list that includes a list of addresses of data blocks required by the application,
        transfers the at least one thread list to the drive buffer, and
        generates SCSI read commands to retrieve portions of the predetermined data when required by the application; and
    a hard disk drive controller, including;
        means for locating predetermined data on the at least one hard disk in accordance with the list of addresses of data blocks of the at least one thread list stored in the drive buffer and storing the predetermined data in the drive buffer; and
        means for sending the predetermined data stored in the drive buffer to the host computer in response to the SCSI read commands.

3. A multimedia editing system as claimed in claim 2, wherein the at least one thread list includes data specifying a percentage of the drive buffer to be reserved for read ahead data and a percentage of the drive buffer to be reserved for data which has been previously provided to the host computer.

4. A multimedia editing system as claimed in claim 2, wherein the at least one block of file access data is defined in terms of a logical block address, an offset to a first byte and the total number of bytes in the at least one block of file access data.

5. A multimedia editing system as claimed in claim 2, wherein the at least one thread list includes a video thread and an audio thread.

6. A multimedia editing system as claimed in claim 5, wherein the video thread includes a video data sample rate and the audio thread includes an audio sample rate.

7. A method of caching data used by a host application running on a host computer, comprising the steps of:
    providing a data storage device having a storage medium, a storage device buffer and a controller in an integrated unit;
    determining what data will be required by the host application and generating a list of predetermined data;
    generating at least one thread list that includes a list of addresses of data blocks for the predetermined data;
    storing the at least one thread list in the storage device buffer;
    locating the predetermined data on the storage medium in accordance with the list of addresses of data blocks of the thread list, and
    storing the predetermined data in the storage device buffer in accordance with the thread list.

8. A method of caching data as claimed in claim 7, wherein the at least one thread list defines a plurality of non-contiguously located data blocks.

9. A method of caching data as claimed in claim 7, wherein the at least one thread list comprises a plurality of thread lists, each thread list defining a distinct host application data stream requirement.

10. A method of caching data as claimed in claim 7, wherein the step of providing a data storage device comprises providing a hard disk drive.

11. A method of caching data as claimed in claim 7, wherein the at least one thread list includes at least one data access parameter reflecting host application data requirements.

12. A method of caching data as claimed in claim 11, wherein the at least one data access parameter includes at least one of data prioritization, cache management, error processing, thread type and data supply rate.

13. A method of caching data as claimed in claim 11, wherein the at least one data access parameter comprises an error processing parameter which causes the data storage device to resend a last sample in response to a condition where a next sample is not available in the storage device buffer and cannot be retrieved from the storage medium within a predetermined time.

14. A method of caching data as claimed in claim 11, wherein the at least one data access parameter comprises a data reverse parameter.

15. A method of caching data for use with a host computer running a host application, the method comprising the steps of:
  providing a data storage device having a storage medium, a storage device buffer and a controller in an integrated unit;
  determining what data will be required by the host application and generating a list of predetermined data;
  generating at least one thread list that includes a list of addresses of data blocks for the predetermined data;
  storing the at least one thread list in the storage device buffer;
  locating the predetermined data on the storage medium in accordance with the list of addresses of data blocks of the thread list, and
  storing the predetermined data in the storage device buffer in accordance with the thread list.

16. A method of caching data as claimed in claim 15, wherein the at least one thread list defines a plurality of non-contiguously located data blocks.

17. A method of caching data as claimed in claim 15, wherein the at least one thread list comprises a plurality of thread lists, each thread list defining a distinct host application data stream requirement.

18. A method of caching data as claimed in claim 15, wherein the step of providing a data storage device comprises providing a hard disk drive.

19. A method of caching data as claimed in claim 15, wherein the at least one thread list includes at least one data access parameter reflecting host application data requirements.

20. A method of caching data as claimed in claim 19, wherein the at least one data access parameter includes at least one of data prioritization, cache management, error processing, thread type and data supply rate.

21. A method of caching data as claimed in claim 19, wherein the at least one data access parameter comprises a data reverse parameter.

* * * * *